United States Patent [19]

Stoll et al.

[11] 4,199,130

[45] Apr. 22, 1980

[54] VALVE ARRANGEMENT

[75] Inventors: Kurt Stoll, Esslingen, Fed. Rep. of Germany; Jan R. deFries, Zürich, Switzerland

[73] Assignee: Festo-Maschinenfabrik Gottlieb Stoll, Esslingen, Fed. Rep. of Germany

[21] Appl. No.: 888,534

[22] Filed: Mar. 21, 1978

[30] Foreign Application Priority Data

Mar. 22, 1977 [DE] Fed. Rep. of Germany ....... 2712491

[51] Int. Cl.[2] ..................... F16K 31/126; F16K 31/02

[52] U.S. Cl. ........................................ 251/29; 251/30; 251/138; 137/596.17; 137/625.64

[58] Field of Search ....................... 251/26, 29, 30, 43, 251/46, 138; 137/596.17, 625.64

[56] References Cited

U.S. PATENT DOCUMENTS

| | | | |
|---|---|---|---|
| 2,850,258 | 9/1958 | Lazich | 251/138 |
| 2,935,972 | 5/1960 | Segerstad | 251/29 |
| 2,937,846 | 5/1960 | Hannant et al. | 251/29 |
| 2,993,149 | 7/1961 | Persons | 251/138 |
| 3,038,500 | 6/1962 | Lansky et al. | 251/30 |
| 3,140,727 | 7/1964 | Cutler | 251/30 |
| 3,176,954 | 4/1965 | Cameron et al. | 251/29 |
| 3,198,207 | 8/1965 | Willis et al. | 251/29 |
| 3,611,878 | 10/1971 | Puster | 251/138 |

*Primary Examiner*—Martin P. Schwadron
*Assistant Examiner*—G. L. Walton
*Attorney, Agent, or Firm*—Blanchard, Flynn, Thiel, Boutell & Tanis

[57] ABSTRACT

A valve arrangement having a housing with an inlet for pressurized fluid and an outlet. A chamber is provided in the housing having a flexible diaphragm therein dividing the chamber into a control chamber and a pressure chamber. The pressure chamber and the control chamber are each connected in fluid circuit with the pressurized fluid supplied to the inlet through a constant cross section throttle opening. An analogue pressure regulator is provided for maintaining the pressure of the pressurized fluid in the control chamber constant independent of pressure variations in the pressure of the pressurized fluid. The analogue pressure regulator includes a control opening providing fluid communication from the control chamber to the outlet and a pivotally supported armature movable into and out of blocking relation with the control opening. A resilient mechanism is provided for resiliently biasing the armature so that its effective weight adjacent the control opening is approximately nil and is generally in a floating relation relative to the control opening so that pressure variations in the pressurized fluid will effect a pivoting of the armature and a consequent maintaining of the pressure in the control chamber constant. An electric magnetizing coil is mounted on the housing in magnetizing relation to the armature.

7 Claims, 2 Drawing Figures

VALVE ARRANGEMENT

FIELD OF THE INVENTION

Background Of The Invention

A known assembly for signal conversion of this kind comprises a magnetizing coil and a pivoted armature designed in such a manner that the resetting spring presses the tiltable armature tightly against the control bore opening when the magnetizing coil is not energized, while, with the energized coil the force of the resetting spring is overcome by the magnetic field built up in the assembly, so that the control bore is fully opened. With this known assembly the energized magnetizing coil thus is the only part in the assembly which controls the movement of the pivoted armature during the opening process, and initiates the corresponding changes in pressure which make it possible for a pilot valve to actuate a control element in the valve. The inductor current which must be supplied to the magnetizing coil in order to overcome this closing pressure, is considerable. Usually, the power input which normally exceeds 1 Watt, has to be of the order of 5 to 9 Watt. This, again, means that the magnetizing coil, if it is expected to respond to an electronic circuit such as an electronic calculator or the like, must be provided with output signals adjusted to the required level by means of additional electronic amplification. Apart from the complicated and correspondingly expensive circuitry of supplementary amplification systems of this kind, the latter present a number of problems. Among them, the following problems are especially important:

1. With all consumers connected to a power stage of this kind it is necessary that at the moment the assembly is through-connected, the specified values of the voltage and current data should be reached. compared with steady stage conditions, a much higher, controlled wattage must therefore be made available.
2. It is important that all interference between the varius consumers should be avoided. This again means that the power input must be of a high value.
3. Extensive measures have to be taken in order to deflect the high inverse voltages which are present when a magnetizing coil is disconnected, while at the same time provision has to be made for a smooth and swift switching sequence.

The problems outlined above have been encountered under conditions where the expenditure for amplification exceeded the expenditure for purely electronic signal processing, and the former therefore had to be regarded as the most significant criterium in the assessment of the practical applicability of these control systems.

In order to ensure that the pneumatic control elements respond independently of electronic output amplifiers it has been proposed to convert the small D.C. signals obtained with pneumatic analogue control into pressure changes, using suitable instrumental means, and to utilise these changes in pressure for the actuation of pneumatic valves. The drawback of this possibility, however, is that the switching times are considerably increased because of the relatively wide spaces which have to be overcome in the auxiliary system and because of the necessarily small jet dimensions. This increase in the switching time was found to be so great that it resulted in a difference of several powers of ten compared with the signal sequence of the respective electric transducers. This shortcoming made the viability using electronic calculators or of electronic programming respectively, questionable because the pneumatic control system was not capable of responding to the sequence of order signals without considerable delays.

It is an object of the present invention to provide an assembly for signal conversion of the above kind which permits converting electronic signals into pneumatic order signals without experiencing the delays of known arrangements, provision being made for the pneumatic control signals to be directly transmitted into electronic calculators, micro-processors, and micro-assemblers, or the like.

According to the invention the assembly for signal conversion is provided with a first restrictor element between the pilot valve and the connecting point for compressed air and, at the bore of the control unit, with a second restrictor element which may be influenced or rather controlled by the pivoted armature; with the magnetizing coil not energized, this pivoted armature is enabled to press against the controllable second restrictor element hard enough to initiate a build up of a constant control pressure which is independent of the supply pressure.

It follows that with an assembly for signal conversion according to the invention it is not the outflow which is controlled but the inflow, and consequently the pressure between the two restrictor elements. Thus, in contrast to known assemblies of this kind, the pivoted armature and the pilot valve are not only a two-way control unit since according to the invention the pressure in the servo- or rather auxiliary chamber, which is connected with the pivot valve, may be influenced by using different inflow and outflow cross-sections. Thus it is the design of the pivoted armature and the second restrictor of the auxiliary chamber which ensure that a simple, analogue pressure regulation is possible, whereby the closing force of the pivoted armature may be limited at a preselected pressure; this means that also the magnetic opening force is limitable at a preselected value, both of these variable values being independent of the supply pressure. This means that a very moderate power will suffice to excite the magnet coil sufficiently to lift the pivoted armature off, because the corresponding pressure may be as small as desired. The control pressure may thereby, according to the invention, be set at a value which retains the pivoted armature in its stable end position in which the second restrictor element is slightly opened so that compressed air may escape and be re-admitted. Whereas with conventional pressure sources the pressure varies within a margin between some 2 and 10 bar, the control pressure may be maintained constant at a value of say 2 bar, when using the assembly according to the invention. The magnetic force produced by the energized magnetisation coil therefore only has to overcome the difference between the force of the resetting spring and the actually effective control pressure, and this difference is always of the same value and may be set accordingly. With this, not only the power required for pneumatic switching is reduced but also the switching time becomes considerably shorter. With the assembly according to the invention it suffices for the magnetisation coil to be driven with a signal output of approximately 0.1 Watt. From this it follows that also the magnetic inverse voltages are of a low value and that consequently also any problems of inverse voltage and problems related to the necessary temporal degradation of the inverse voltages encountered with the assembly according to the invention will be smaller by at least two powers of ten compared with previous arrangements. In addition to this the switching rate is faster by approximately a factor of 2 to 3 compared with conventional systems, and the assembly according to the invention or rather the operating or similar valves controlled by it, may be more easily adapted to the rapid rate of the signal-flow which has to be expected when operating with electronic calculators, micro-processing, and micro-assembling units and the like.

With an alternative embodiment according to the present invention the two-state principle has been applied insofar as the pilot valve located in the auxiliary chamber, which is provided with a diaphragm, acts at a second pilot valve which is preferably likewise provided with a diaphragm, and interacts with a main control valve. In this manner the number of the pneumatic amplifiers which are arranged downstream, may be doubled, and this again enables the rate of switching to be considerably reduced. This reduction in the switching time is possible because the size and pressure of the energy current supplied to the switching diaphragm of the first pilot valve are considerably smaller than the corresponding values required with the second pilot valve. Similarly to the above, the pressure which must be supplied by the switching diaphragm of the first pilot valve is merely a constant switching pressure which is independent of the supply pressure.

The switching constant pressures which are of different orders of magnitude may conveniently be used for the control of a second and any further parallel valve arrangements which are like-wise located in a bore of the assembly according to the invention. This second, parallel, valve assembly is driven by the same electric part and the same pressure regulation part, in a push-pull arrangement. All that is required in this case is to ensure that the diaphragm of the first pilot valve of the second valve assembly is driven with both constant pressures, but reversedly relative to the switching diaphragm of the first pilot valve of the first valve arrangement. This does not exclude, however, the possibility of switching in the same direction.

BRIEF DESCRIPTION OF THE DRAWINGS

Further details and embodiments of the invention may be deduced from the specification which follows below, which described and explains the invention, reference being made to the drawings in which.

DETAILED DESCRIPTION

Figure 1:
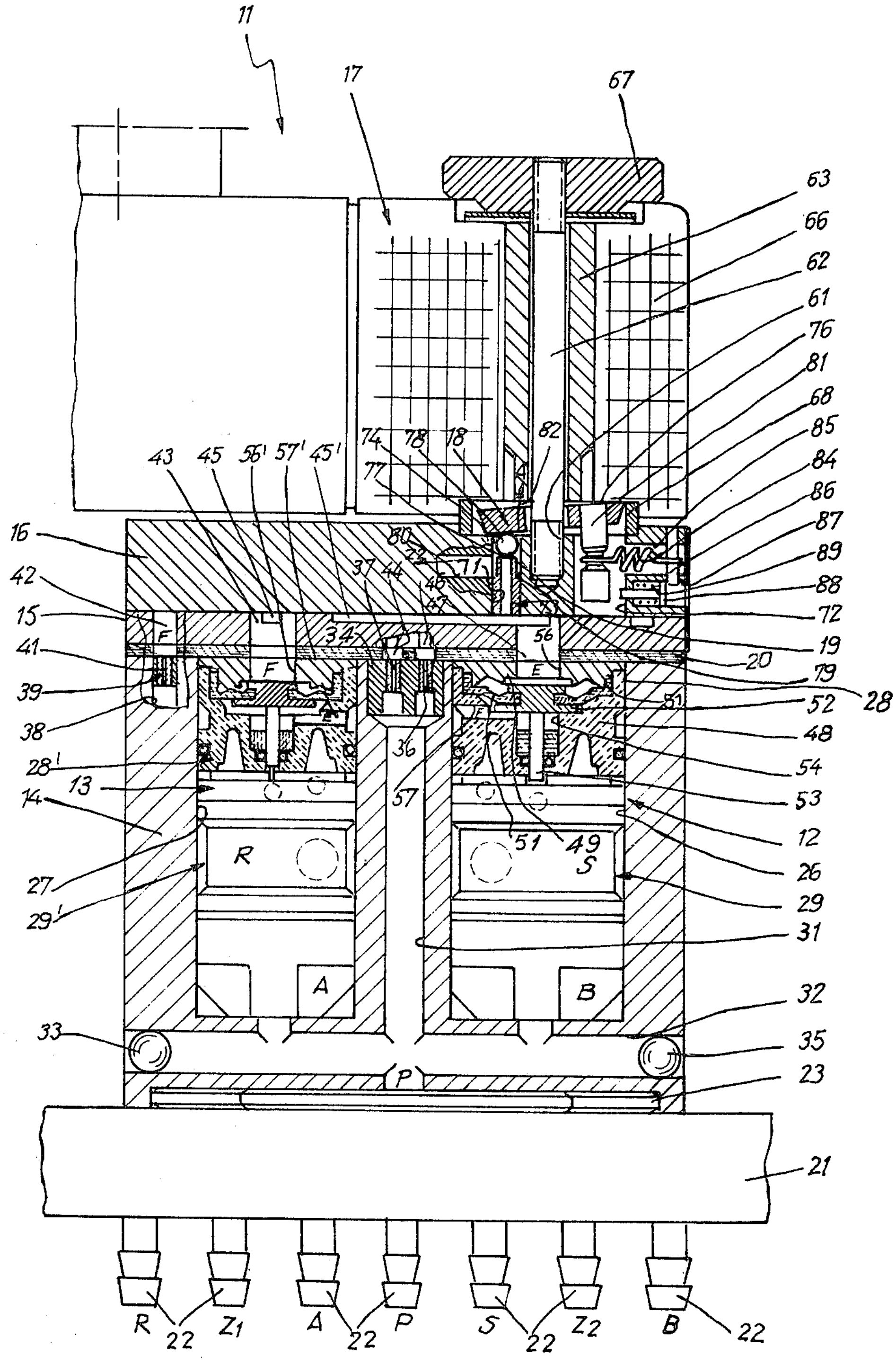
FIG. 1 illustrates an assembly for signal conversion according to a chosen embodiment of the present invention, in a longitudinal section.

The signal converter 11 according to one embodiment of the present invention, which is represented by the drawing, serves for the conversion of electric signals emitted by an electronic device for example an electronic calculator, a micro-processor, a micro-assembler, or the like, into pneumatic signals for one or several arrangement(s) of control valves 12 and/or 13 which drive or rather operate a pneumatic control element of work units or another control assembly. The design of the signal converter 11 is such that signals of moderate power output, of say, 0.1 to 0.15 Watt, which are emitted from the electronic device may be directly converted into pneumatic control signals having a sufficiently high frequency and being capable of driving control elements without using an intermediate electric amplifier.

The signal converter 11 according to the invention comprises a housing 14 in which are provided two control valve sets 12 and 13, which are arranged parallel to one another both with respect to the space taken up and to the switching techniques involved. The housing cover plate 16 which is fixed to the housing 14 over an intermediate plate 15 and a seal 20 in a pressure-tight manner supports an assembly of electromagnets 17, the pivoted armatures 18 of which, interacting with a control opening 19 of the signal converter 11, constitute an anlogue pressure regulator. The housing 14 is pressure-tightly connected through a seal 23 with a connector plate 21 whose underside is provided with nipples 22.

Figure 2:
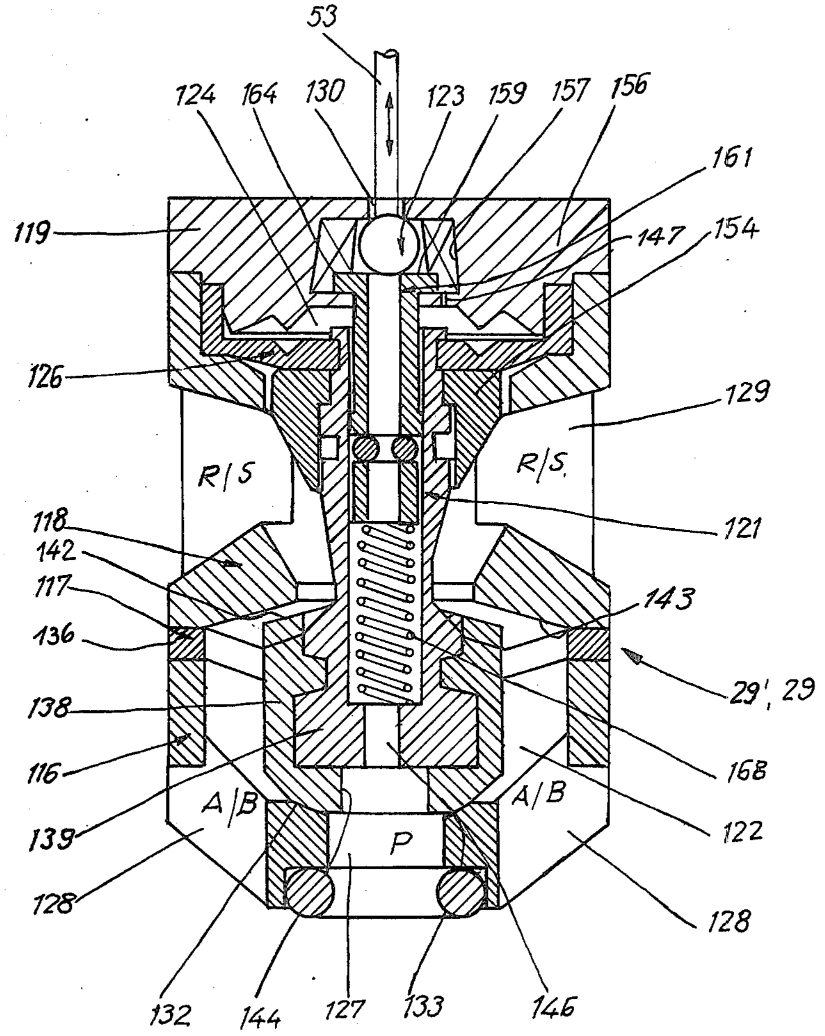
FIG. 2 illustrates a valve arrangement used with the assembly according to the invention, which consists of a second pilot valve and a multiway valve, again in a longitudinal section.

The housing 14 has two parallel bores 26 and 27 which accommodate the control valve assemblies 12 and 13 of which only the first pilot valve 28 or 28' respectively is shown in detail, whereas the subsequent second stage, which is the two-stage control valve 29 or 29' respectively, is shown in a schematic representation. FIG. 2 depicts an embodiment of this control valve 29, 29'. An axial supply passage 31 extends through the housing 14 between the two bores 26 and 27 which accommodate the control valves 12, 13, and opens, near its end adjacent to the connecting plate 21, into a transverse bore 32, its two ends being sealed by means of two balls 33 which are pressed into the bore which is connected not only with the supply passage 31 but also with the two bores 26 and 27. The supply passage 31 which is connected with a pressure nipple P of the connector plate 21 has an enlarged diameter end section at its other end, in which a restrictor element 34 is held in a pressure-tight manner, its two parallel bores 36, 37 serving as inlets into a restriction chamber E or F respectively. The bore 41 of the outgoing restrictor of the second pressure chamber F extends through a second unit 39 which is accommodated in a lateral, axial bore 38 through the housing 14. This passage 38 is connected with the nipple $Z_1$ of a return line at the connector plate 21. It is always open, and is not shown in the drawing.

The first servo- or pilot valves 28, 28' are identical. They comprise a valve casing 48 which is supported in the corresponding bore 26, 27, in a pressure-tight and nondisplaceable manner and into which a diaphragm 51 is fitted with the aid of a lid 49, so that its outer edge is fixed while the centre of the diaphragm may move in both axial directions. The centre of the diaphragm supports the collar 52 of a tappet 53 which projects in a pressure-tight manner through an axial bore 54 in the valve casing 48 and interacts with the subsequent control valve assembly 29, or 29'. The cover 49 of the pilot valve 28, 28' moreover comprises an axial bore 56 or 56' respectively opposite one end of the tappet collar 52—it is the upper end in FIG. 1—and a radial bore 57 or 57' respectively in the casing 48, this bore being located at the level of the other end of the tappet collar 52—which is the lower end in FIG. 1. The only difference consists in the manner in which the two pilot valves 28, 28' are operated, in that in the case of the pilot valve 28 the axial bore 56 is connected with the pressure chamber E, and the radial bore 57 is connected with the pressure chamber F, while the axial bore 56' of the pilot valve 28' forms part of the pressure chamber F, and the radial bore 57' forms part of the pressure chamber E.

Before the arrangement of electromagnets 17 and their interaction with the control opening 19 may be discussed it is mentioned that the corresponding connecting ports of the control valves 29, 29' are connected with the associated venting nipples, R, S, and with the connections A, B in the manner which is not shown in the drawing.

In the cover plate 16 is provided, approximately opposite to the control valve assembly 12, a blind bore 61 which opens upwards and into which a bolt or the like 62 is screwed, the magnetic soft iron core 63 of the magnetising coil 17, which supports a winding 66 of the coil, being pushed over the bolt. The complete magnetising coil 17 is fixed to the bolt 62 with the aid of a nut 67 and an annular end-support 68 which is accommodated in a recess in the cover plate 16. In a region below the ring 68 are provided two parallel bores 71, 72 which extend along either side of the threaded bore 61, through the cover plate 16. The smaller bore 71 which is connected with the pressure chamber E contains a pressed-in jet nozzle 73 of an adjustable choke device 74 whose control opening 19 is provided with a seat 77 for a valve control ball 78 which is controlled inside the bore 71. A transverse bore 80 which is connected with the nipple $Z_2$ of a permanently open return line opens into a section of an annular groove 79 between the bore wall and the nozzle 73, the annular groove being open towards the top. In the non-energized state of the magnetizing coil 17, the control ball 78 supports the freely tiltable end of the pivoted armature 18, whose other end constituting the pivot axis 76, is fixed to a vertically projecting pin 81 which extends into the bore 72. The end of the pivoted armature 18 which is provided with the pin 81 always rests against the magnetising coil 17. The pivoted armature 18 extends, towards its free end, at a slight inclination towards the pole are 82 of the magnetizing coil 17, so that a gradually tapering air gap is formed whose maximum opening dimension is approximately 2 mm. The area approximately in the middle of the pin 81 which extends into the bore 72, comprises a necking where a reset spring 84 acts, which is provided inside a bore 85 which extends at right angles to the bore 72, its other end being fixed to a pin 86 which projects across the bore 85. This pin 86 just projects into a bore 87 which is parallel with the bore 85 and accessible from the outside of the cover plate 16. An operating knob 88 is pressed against the pin 86 by the load of a spring 89. The front end of this knon 88 extends into the bore 72 at a vertical level where it is opposite to the end of the pin 81 which supports the pivoted armature. In this manner the pivoted armature 18 may be moved by hand against the force of a resetting spring 84 so that the armature is tilted in the direction of the arrow A, towards the pole area 82. The same tilting movement A may be effected by energisation of the magnetising coil 17.

The functions of the signal converter 11 are as follows: When the signal converter 11 is connected through a pressure line P with a pneumatic source normally supplying pressure within 2 to 10 bar, pressure is admitted into the chambers E and F through the supply line 31 and the two restrictor passages 36, 37. Since the other end of the pressure chamber F is likewise provided with a constant cross-section restrictor bore 41, pressure will build up in the chamber F which is approximately constant but affected by pressure fluctuations in the pneumatic source. In the pressure chamber E, however, a constant control pressure which is independent of the supply pressure P may build up because the pivoted armature 18, interacting with its resetting spring 84 and the restrictive assembly 74 formed by the control opening 19 and the control ball 78, constitutes an analogue pressure regulator. The weight of the pivoted armature 18 and the pretension or rather the characteristics of the resetting spring 84 are thereby adjusted to ensure that the control ball 78, when pressure is available in the chamber E, is lifted off its seat 77 so that part of the compressed air may escape from the control opening 19 and return through the return line $Z_2$. Depending on the instantaneous pressure of the pneumatic source, the control ball 78 will be lifted off its seat more or less appreciably which results in any case in an adjustment to constant control pressure (p). This means that a very moderate magnetic force is required for overcoming the difference between the force of the resetting spring 84 and the constant control pressure p. Therefore, in order to operate the magnetising coil 17 a signal line will be sufficient of approximately 0.1 Watt the maximum requirement being limited at 0.15 Watt. The floating arrangement of the pivoted armature 18 in the state of rest, which enables the control pressure p to adjust itself to the value of the constant control pressure not only guarantees a very moderate actuating power but also a very considerable switching rate because the compressed air at the control opening 19 will always be in motion.

With a non-energized magnetisation coil 17, the constant control pressure is therefore available at the first pilot valve 28 of the control valve assembly 12 in chamber E, and the pressure in the chamber F will, in the case of the chosen embodiment, be approximately ⅓ of the control pressure. As shown in FIG. 1, the diaphragm 51 of the first pilot valve 28 is thereby forced downwards so that the tappet 53 maintains the control valve unit 29 open, this being so in the state of rest. On the other hand, in this state of rest, the pressures are reversed at the first pilot valve 28' of the parallel control valve assembly 13, so that the diaphragm 51 is forced back under the effect of the higher control pressure p. This means that the tappet 53 closes the control valve unit 29', as shown in FIG. 2. When the magnetising coil 17 receives an electronic signal the pivoted armature 18, affected by the resulting magnet force, is attracted in the direction of the arrow A, and the control ball 78 comes completely free from the control opening 19. Consequently the air in the pressure chamber E which is slowly moving, may escape more rapidly through the increasing control opening 19, leading to a corresponding pressure reduction in the chamber E. This pressure reduction is so great that the pressure in the chamber E drops to a value below that of the permanently approximately constant pressure in the chamber F. With these pressures, the diaphragm 51 of the first pilot valve 28 will move upwards as indicated in FIG. 1, and that of the first pilot valve 28' will move downwards. In this manner a switching process is obtained with both pilot valves which, in the illustrated embodiment occur in opposite directions. The switching operations of the control valve assemblies 29 and 29' correspond to these movements.

It seems evident that more than two parallel control valve sets may be used with the assembly according to the invention, and that these control valve arrangements may be switched in the same direction if desired.

FIG. 2 enables a control valve unit 29, 29' to be described by way of example, the unit being operated by the first pilot valves 28, 28', and containing a main control valve which is connected with the first servo- or rather pilot valve through a second servo- or pilot valve 123. In this manner the arrangement is of two stages, and therefore serves as a means of pneumatic amplification, considerable pneumatic switching actions being attainable at a high switching rate. The cartridge-like control valve units 29 and 29' are identical and designed in the form of multiway valves having the shape of a valve insert which fits pressure-tightly into the corresponding bores 26, 27. From the bottom to the top that is to say from the pressure connection to the operating end, the control valve assembly 29, 29' comprises a first ring 116, a spokewheel shaped part 117, a second ring 118, and a disc shaped cover 119. Inside, and coaxial with these elements are a main valve body 121, located in a main valve chamber 122; a control valve body 123 in a control valve chamber 124, and a diaphragm 126, which isolates pressure-tightly the main valve chamber from the control valve chamber 124. In addition to this are provided, an axial pressure opening 127, and operating openings 128 which are concentric with the former, radial main venting openings 129, and an axial bore 130 for venting the control valve.

The axial pressure bore 127 opens into the main valve chamber 122 part of which is located inside the ring 116. This ring 116 is provided with a first seating area 132 which is located at its end face adjacent to the main control chamber 122, and which is annular in shape, extends conically outwards, and surrounds the pressure bore 127 concentrically. It enables the main valve body 121 to let its sealing face 133 be in pressure-tight contact with the seating area. An annular preferably conical surface opposite to the valve housing 12, which concentrically surrounds the pressure opening 127 is provided with a number of evenly distributed bores which form the operating opening 128 and are likewise opening into the main valve chamber 122.

The rim 136 of the spokewheel-shaped part 117 which is integrally formed from a suitable, resilient, plastics material, is firmly anchored between the two rings 116 and 118. The hub forms a sleeve 138 for the front end 139 of the main valve body 121, and comprises a sealing area 133. The front end of the main valve body 121 and the sleeve 138 are substantially in positive surface contact. The end of the sleeve 138 which is remote from the sealing area 133, has moreover a rear sealing surface 142 which interacts with a second seat 143 of a section of the second ring 118, which projects inwards. Also the sleeve 138 has an axial bore 144 whose diameter is smaller than that of the pressure bore 127 but exceeds the diameter of a continuous bore 146 through the main valve body 121, and constitutes part of the connection 147 between the pressure bore 127 and the control valve chamber 124. It is due to these differences between the diameters that annular end faces are formed at the sleeve 138 and main valve body 121 respectively which are exposed to the pressure medium admitted through the pressure bore 127.

In its central region the second ring 118 is provided with radial bores which are arranged over its circumference and constitute the venting opening 129 of the main valve. Depending on the position of the main valve body 121, they may be connected with the main valve chamber 122, or isolated from the latter. The outer end of this second ring 118 holds the diaphragm 126 which supports, approximately centrally, the main valve body 121 in positive surface contact. The diaphragm 126 which consists of a resilient plastics material is shaped in such a manner that the main valve body 121 may be floatingly suspended. On the inner side, and remote from the control valve chamber 124, the diaphragm 126 rests against the front end face of a sleeve 154 which is in positive contact with the main valve body 121. The cover 119 which is provided with an axial vent opening 130, is mounted on top of the second ring 118. An extension 156 of the cover 119 which projects inwards holds the diaphragm 126 in positive, axial surface contact and serves as a large dimensioned stopping face for the diaphragm 126 when the main valve body 121 assumes its second end-position which is not shown in the drawing.

The control valve chamber 124 provided between the cover 119 and the diaphragm 126 is defined, among other features, by a conically widened axial cavity 157 in the cover 119, which is connected with the venting bore 130 of the control valve, and supports a ball shaped control valve body 123 with the aid of radial ribs, guiding its movements. This control valve ball 123 is actuated by the tappet 53 of the first pilot valve 28, 28', which projects through the venting bore 130. The valve ball 123 may seal the control venting bore 130 as shown in the drawing, by being pressed against this opening, and may on the other hand, come home at a seat 159 provided at the end of a small tube 151 which extends into the control chamber 124. This small tube 161, whose axial bore is connected with the continuous bore 146 through the main valve body 121 and likewise forms part of the connection 147, projects into the continuous bore 146 of the valve body 121. The small tube 161, affected by the load of a pretensioned compression spring 168 which supports itself on an annular surface in the continuous bore 146, is in surface contact with a stop 164 on the webs on the cover 119. This spring ensures on the one hand that the tube 161 is maintained, prior to switching into the other end position, in the correct way so that its seat 159 for the control valve body 123 maintains a given relative position with the valve body 123, and that, on the other hand, the seat 159 for the control valve body 123 is sufficiently resilient to exclude the danger of overshooting when switching into the other (not repesented) end-position. The axial distance between the seat 159 on the tube 161 and the corresponding sealing area on the control valve ball 123, may be extremely small, measuring for example 60 to 100 times 1/1000 mm, so that only a very small stroke is necessary for the switching of the multiway valve.

The functions of the control valve assembly 29, 29' which is designed as a multiway valve are described as follows: In the drawing, the axially reciprocating main control valve body 121 is shown in the end-position in which the valve body 121 resets against the inner ring 116. In this position the connection between the pressure bore 127 (P) and the operating bore 128 (A, or B) is closed and the operating bore 128 is consequently connected with the main venting bore 129 (R or S). In addition to this, the connecting line 146 which is connected with the pressure bore 127, is connected with the control valve chamber 124. The pressure medium will therefore, on the one hand, press the control valve ball 123 against the venting opening 130 of the control valve, and close it, while, on the other hand, loading the control valve chamber 124. Since the annular surface of the diaphragm 126, which opens into the control valve chamber 124 is larger than the area of the annular surfaces of the main valve body 121 which are immediately adjacent to the opening of the pressure bore 127, the main valve body 121 is retained in this end-position. However, when the valve ball 123 is forced downwards with the aid of the tappet 53 of the first pilot valve 28 or 28' respectively, against the force of the pressure medium in the connecting line 147, the control valve ball 123 releases the corresponding venting hole 130 immediately, closing the bore in the small tube 161 immediately afterwards because the stroke is extremely short, and thereby isolates the control valve chamber 124 from the pressure bore 127 (P). The control valve chamber 124 is vented through the bore 130 without admitting appreciable quantities of the pressure medium through the connecting line 146. As the control valve chamber 124 is vented the pressure on the diaphragm 126 becomes correspondingly smaller and the pressure medium may therefore displace the main valve body 121 in the axial direction so that it assumes its second end-position as soon as the pressure on the annular surfaces of the valve body 121 which face the pressure opening 127 exceeds the pressure in the control valve chamber 124 which loads the diaphragm 126. The lift of the main valve body 121 is assisted by the pre-tensioned part 117 which is shaped like a spoke-wheel and, as soon as the valve body has overcome its central position, snaps into the other end-position. The above applies similarly to the movements in the reversed direction. It will be appreciated that the reversal is extremely rapid, because the venting of the control valve chamber may be accomplished without an appreciable intake of pressure media. In this second end-position, which is not shown in the drawing, the pressure bore 127 (P) is connected with the operating bore 128 (A or B) through the main valve chamber 122, while the venting bore 129 (R or S) is pressure-tightly isolated from the main valve chamber 122. With this arrangement one or several hydraulic or pneumatic operating assemblies (they are not shown in the drawing) may be driven. When the tappet 53 returns upwards the control valve ball 123 releases the opening of the bore in the small tube 161 or the connecting bore 147 respectively which connect with the control valve chamber 124, and closes the venting bore 130 of the control valve under the effect of the pressure medium which is loading the ball 123. Thus the ball 123 of the control valve is automatically forced into the end-position in which it closes the vent bore 130 of the control valve. As the connecting line 146 is opened, pressure medium is admitted again into the control valve chamber 124, and the main valve body 121 may consequently return into its first end-position as soon as the pressure on the diaphragm 126 exceeds the pressure on the annular surfaces of the main valve body 121 which are adjacent to the pressure bore 127.

Although our invention has been illustrated and described with reference to the preferred embodiments thereof, we wish to have it understood that it is no way limited to the details of such embodiments, but is capable of numerous modifications within the scope of the appended claims.

Having thus fully disclosed our invention, what we claim is:

1. A valve arrangement having at least a main valve including an inlet and an outlet and a pilot valve assembly, comprising:

a housing for housing said main valve and said pilot valve assembly and having first means defining a second inlet for a pressurized fluid and second means defining a second outlet;

a chamber in said housing;

a flexible diaphragm in said chamber dividing said chamber into a control chamber and a pressure chamber, said pressure chamber and said control chamber being each connected in fluid circuit with said pressurized fluid supplied to said second inlet through a constant cross section throttle opening;

analogue pressure regulator means for maintaining the pressure of said pressurized fluid in said control chamber constant independent of pressure variations in the pressure of said pressurized fluid, said analogue pressure regulator means comprising:

(a) third means defining a control opening providing fluid communication from said control chamber to said second outlet;

(b) armature means disposed in said second outlet;

(c) pivot means pivotally supporting said armature means for movement into and out of blocking relation with said control opening and resilient means for resiliently biassing said armature means so that its effective weight adjacent said control opening is approximately nil and is generally in a floating relation relative to said control opening wherein pressure variations in said pressurized fluid will effect a pivoting of said armature means and a consequent maintaining of the pressure in said control chamber constant;

electric magnetizing coil means mounted on said housing in magnetizing relation to said armature means.

2. The valve arrangement according to claim 1, wherein said pivot means of said armature means is located about an edge of said armature means which is remote from said control opening, wherein a projecting pin is provided whereat said resilient means may apply its force, and wherein a spring loaded operating knob is provided which acts at the free end of said pin.

3. The valve arrangement according to claim 1, wherein said armature means, retained in its position of rest by the force of said resilient means, slopes towards a pole area on said magnetizing coil, so that a gradually changing air gap is formed.

4. The valve arrangement according to claim 1, wherein said diaphragm has a tappet which is centrally suspended therefrom and interacts with said pilot valve.

5. The valve arrangement according to claim 4, wherein said diaphragm and said tappet define an actuator for said pilot valve and said actuator and said pilot valve being located one above the other in a casing bore in said housing.

6. The valve arrangement according to claim 1, wherein between the free end of said armature means and said control opening there is arranged a ball which is movably guided in an opening of said housing.

7. The valve arrangement according to claim 1, wherein said pressure chamber which lies on the side of said diaphragm opposite said control chamber, is connected on the one side through said constant cross section throttle opening to said supplied pressurized fluid and on the other side through a further constant cross section throttle opening to the atmosphere.

* * * * *